United States Patent

Nisino et al.

[11] Patent Number: 5,773,621
[45] Date of Patent: Jun. 30, 1998

[54] GAS DISPERSION PIPE FOR GAS-LIQUID CONTACT, AND DEVICE FOR GAS-LIQUID CONTACT MAKING USE THEREOF

[75] Inventors: Haruo Nisino; Akitaka Ide; Toshiaki Urata, all of Yokohama, Japan

[73] Assignee: Chiyoda Corporation, Kanagawa, Japan

[21] Appl. No.: 592,305

[22] PCT Filed: Jun. 13, 1995

[86] PCT No.: PCT/JP95/01183

§ 371 Date: Feb. 9, 1996

§ 102(e) Date: Feb. 9, 1996

[87] PCT Pub. No.: WO95/34370

PCT Pub. Date: Dec. 21, 1995

[30] Foreign Application Priority Data

Jun. 13, 1994 [JP] Japan .................................. 6-154262
Jun. 13, 1994 [JP] Japan .................................. 6-154263
Nov. 22, 1994 [JP] Japan .................................. 6-311311

[51] Int. Cl.[6] .................................................. B01D 47/10
[52] U.S. Cl. .............................. 55/244; 55/256; 95/226; 261/121.1; 261/DIG. 54
[58] Field of Search ........................... 55/255, 256, 244, 55/248, 249; 95/224, 226, 235; 261/121.1, 124, DIG. 54

[56] References Cited

U.S. PATENT DOCUMENTS

| | | | |
|---|---|---|---|
| 2,511,833 | 6/1950 | Beckel et al. .......................... | 261/121.1 |
| 2,720,280 | 10/1955 | Doyle .......................................... | 95/235 |
| 2,902,269 | 9/1959 | Eichelman ............................... | 261/124 |
| 3,364,880 | 1/1968 | Ver Hoeven ........................... | 261/124 |
| 3,386,712 | 6/1968 | Pafla ................................ | 261/DIG. 54 |
| 3,522,734 | 8/1970 | Curby ........................................ | 55/256 |
| 3,707,067 | 12/1972 | Dietrick .......................... | 261/DIG. 54 |
| 3,747,745 | 7/1973 | Mare ........................................ | 95/226 |
| 3,806,039 | 4/1974 | Mocarski ............................. | 239/417.3 |
| 3,827,216 | 8/1974 | Mare ........................................ | 95/226 |
| 3,950,151 | 4/1976 | Martin ....................................... | 95/226 |
| 4,045,525 | 8/1977 | Huggins .................................. | 261/124 |
| 4,156,712 | 5/1979 | Kanai et al. .......................... | 261/121.1 |
| 4,356,009 | 10/1982 | Calvert ....................................... | 95/226 |
| 4,368,060 | 1/1983 | Yanagiako et al. ....................... | 95/235 |
| 4,419,331 | 12/1983 | Montalvo .................................. | 55/256 |
| 4,935,221 | 6/1990 | Bronfenbrenner et al. .............. | 95/235 |

FOREIGN PATENT DOCUMENTS

| | | |
|---|---|---|
| 396375 | 11/1990 | European Pat. Off. ................. 95/226 |
| A-0 676 230 | 10/1995 | European Pat. Off. . |
| A-2 355 554 | 1/1978 | France . |
| A-2 615 415 | 11/1988 | France . |
| 197803 | 9/1976 | Germany ............................... 261/124 |
| A-34 02 819 | 7/1985 | Germany . |
| 527945 | 11/1957 | Italy ........................................ 95/226 |
| 59-11322 | 3/1944 | Japan . |
| 30-7865 | 10/1955 | Japan . |
| 54-37071 | 3/1979 | Japan . |
| 55-7291 | 2/1980 | Japan ..................................... 55/256 |
| 55-37295 | 9/1980 | Japan . |
| 57-6375 | 2/1982 | Japan . |
| 59-4416 | 1/1984 | Japan ..................................... 55/256 |
| 59-4420 | 1/1984 | Japan ..................................... 55/256 |
| 61-150028 | 9/1986 | Japan . |
| A-01 018 429 | 1/1989 | Japan . |
| 3-72913 | 3/1991 | Japan . |
| 3-262510 | 11/1991 | Japan . |
| 3-70532 | 11/1991 | Japan . |
| 738641 | 6/1980 | U.S.S.R. ................................. 55/256 |
| 2 206 961 A | 1/1989 | United Kingdom . |

Primary Examiner—Duane Smith
Attorney, Agent, or Firm—Armstrong, Westerman, Hattori, McLeland & Naughton

[57] ABSTRACT

A gas dispersion pipe into which gas is introduced through its top end portion and blown out from its bottom end portion into liquid for gas-liquid contact, and a method and a device for gas-liquid contact employing the gas dispersion pipe are disclosed. The gas dispersion pipe has its top end portion formed in a contraction pipe with its horizontal cross-sectional area decreasing downward and/or its bottom end portion formed in a nozzle structure with its horizontal cross-sectional area decreasing downward. Instead of making the gas dispersion pipe with its bottom end portion in the nozzle structure, a gas guide member with its horizontal cross-sectional area increasing downward may be disposed within the bottom end portion of the gas dispersion pipe.

11 Claims, 9 Drawing Sheets

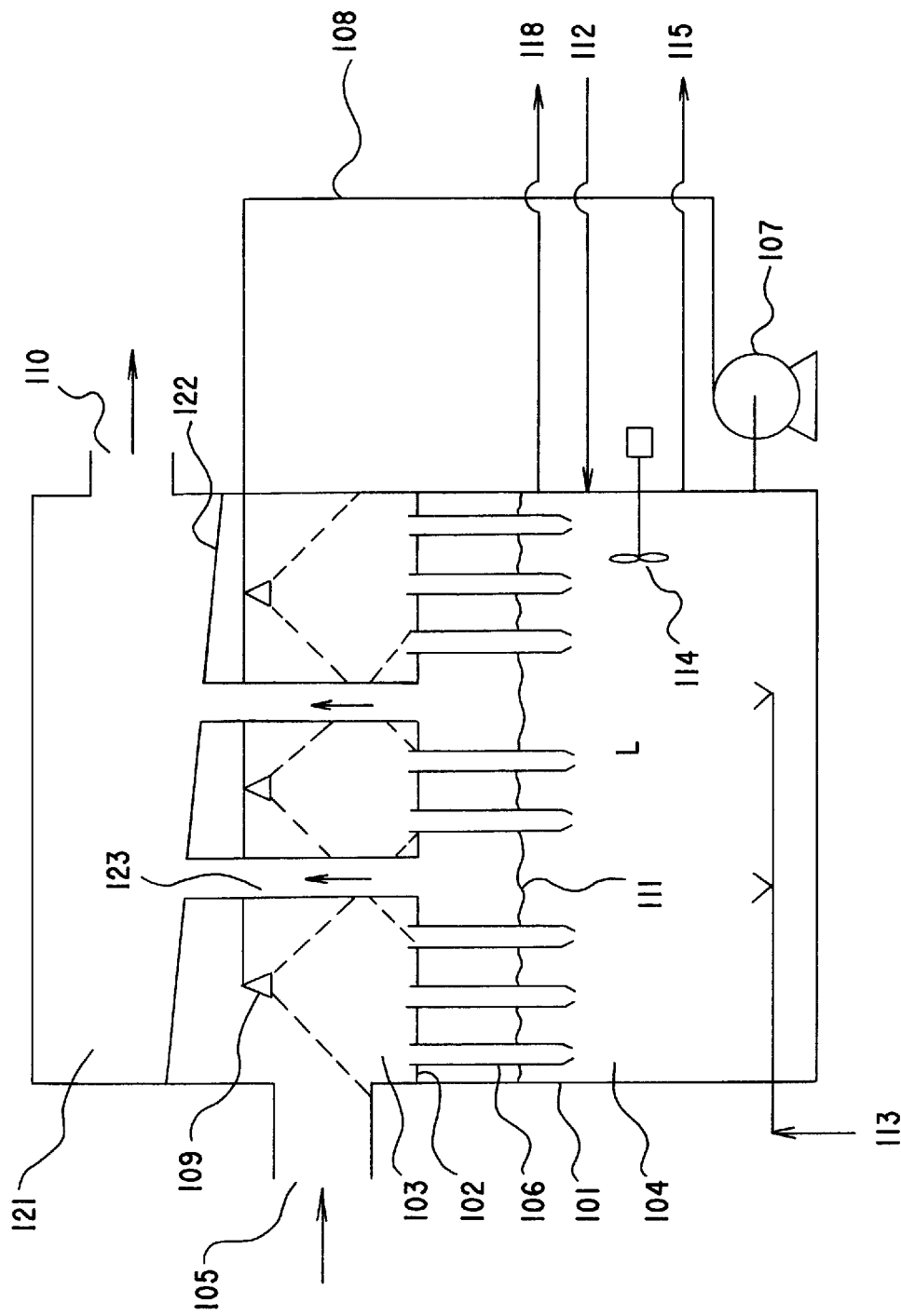

GAS DISPERSION PIPE FOR GAS-LIQUID CONTACT, AND DEVICE FOR GAS-LIQUID CONTACT MAKING USE THEREOF

SPECIFICATION

BACKGROUND OF THE INVENTION

1. Field of the Invention

This invention relates to a gas dispersion pipe for bringing a gas into contact with a liquid (including slurry), and process and device for gas-liquid contact making use of the gas dispersion pipe.

2. Background Art

A device for gas-liquid contact has been widely known (e.g. Japanese Patent Publication Nos. Sho 55-37295, Sho 57-6375, Sho 59-11322, Hei 3-70532, and Japanese Unexamined Patent Publication Nos. Hei 3-72913 and Hei 3-262510) in which a large size tank holds a liquid, a large number of gas dispersion pipes (sparger pipes), each having a plurality of gas jet holes on its lower circumferential surface are arranged in suspension into the liquid, a gas is introduced through the upper opening of the gas dispersion pipe into it and made to jet out from the gas jet holes formed in the pipe end portion to effect gas-liquid contact.

Conventional gas dispersion pipes for use in such a device as described above is of a straight pipe type with an identical inner diameter from its top to bottom end, and has a problem of unwanted pressure loss as the gas is rapidly compressed when it enters the gas dispersion pipe from the atmosphere through the top end opening of the gas dispersion pipe.

The conventional gas dispersion pipe has another problem of the pressure loss. Since the conventional gas dispersion pipe is of a structure in which the gas is jetted out horizontally through the gas jet holes formed in the circumferential wall at the bottom end portion of the pipe, the gas flowing down vertically in the pipe changes its path in the horizontal direction before flowing out from the gas jet holes. As a result, the conventional gas dispersion pipe has also the problem of the pressure loss due to the change in the direction of the gas flow from vertically down to horizontal. The pressure loss in that case is further increased when the gas flow rate in the pipe increases or liquid particles are mixed in the gas.

With the conventional gas dispersion pipe, its inner circumferential wall at its top opening gradually wears off by collision of liquid particles and solid particles contained in the gas. When such abrasion occurs, the conventional gas dispersion pipe has to be replaced entirely and the replacement requires much labor and cost.

The objects of this invention are as follows.

(1) To provide a gas dispersion pipe for gas-liquid contact of a structure having a reduced pressure loss when a gas from a space enters the interior of the pipe through its top opening.

(2) To provide a gas dispersion pipe for gas-liquid contact of a structure having a less pressure loss when the gas introduced from the top opening into the pipe jets out from the gas jet holes at the bottom portion of the pipe.

(3) To provide a gas dispersion pipe for gas-liquid contact of a structure which does not make it necessary to replace an entire pipe, even if its inner circumferential wall at its top opening portion wears away.

(4) To provide a gas-liquid contact process making use of the gas dispersion pipe described above for gas-liquid contact.

(5) To provide a gas-liquid contact device provided with the gas dispersion pipe for gas-liquid contact.

Other objects of this invention will become apparent from the following description.

SUMMARY OF THE INVENTION

This invention provides the following:

(1) A gas dispersion pipe for gas-liquid contact for introducing a gas from its top end portion into the pipe and jetting the gas from the bottom end portion of the pipe into a liquid for gas-liquid contact, in which the top end portion of the pipe is formed in a contraction pipe structure with its horizontal cross-sectional area decreasing downward.

(2) A gas dispersion pipe for gas-liquid contact for introducing a gas from its top end portion into the pipe and jetting the gas from the bottom end portion of the pipe into a liquid for gas-liquid contact, wherein the pipe is formed in a structure in which a contraction pipe with its horizontal cross sectional area decreasing downward is detachably connected to the top end of a straight pipe.

(3) A gas dispersion pipe for gas-liquid contact for introducing a gas from its top end portion into the pipe and jetting the gas from the bottom end portion of the pipe into a liquid for gas-liquid contact, wherein the bottom end portion of the pipe is formed in a nozzle structure with its horizontal cross-sectional area decreasing downward.

(4) A gas dispersion pipe for gas-liquid contact for introducing a gas from its top end portion into the pipe and jetting the gas from the bottom end portion of the pipe into a liquid for gas-liquid contact, wherein the pipe is formed in a structure in which a short nozzle pipe with its horizontal cross sectional area decreasing downward is detachably connected to the bottom end of a straight pipe.

(5) A gas dispersion pipe for gas-liquid contact for introducing a gas from its top end portion into the pipe and jetting the gas from the bottom end portion of the pipe into a liquid for gas-liquid contact, wherein the pipe is formed in a structure in which a gas guide member with its horizontal cross sectional area increasing downward is arranged within the bottom end portion of the gas dispersion pipe with a gap from the inner wall surface of the gas-dispersion pipe.

(6) A gas dispersion pipe for gas-liquid contact for introducing a gas at its top end portion into the pipe and jetting the gas from the bottom end portion of the pipe into a liquid for gas-liquid contact, wherein the pipe is formed in a structure in which a short detachable pipe having a gas guide member with its horizontal cross sectional area increasing downward arranged within the short pipe with a gap from the inner wall surface of the short pipe is connected to the bottom end of a straight pipe.

(7) A gas-liquid contact process wherein a gas is blown into a liquid held in a tank through gas dispersion pipes for gas-liquid contact, which gas dispersion pipes being arranged in suspension in a large number of through holes formed in a partition plate, wherein a selected one type of the gas dispersion pipes described above are used as the gas dispersion pipes for gas-liquid contact.

(8) A gas-liquid contact device wherein a gas is blown into a liquid held in a tank through gas dispersion pipes for gas-liquid contact, which gas dispersion pipes being arranged in suspension in a large number of through holes formed in a partition plate, wherein a selected one type of the gas dispersion pipes described above are used as the gas dispersion pipes for gas-liquid contact.

BRIEF DESCRIPTION OF THE DRAWINGS

FIGS. 15 and 16 are explanatory drawings of gas-liquid contact devices provided with gas dispersion pipes of this invention.

A DESCRIPTION OF A PREFERRED EMBODIMENT OF THE INVENTION

This invention will be hereinafter described more in detail in reference to the appended drawings.

Figure 1:
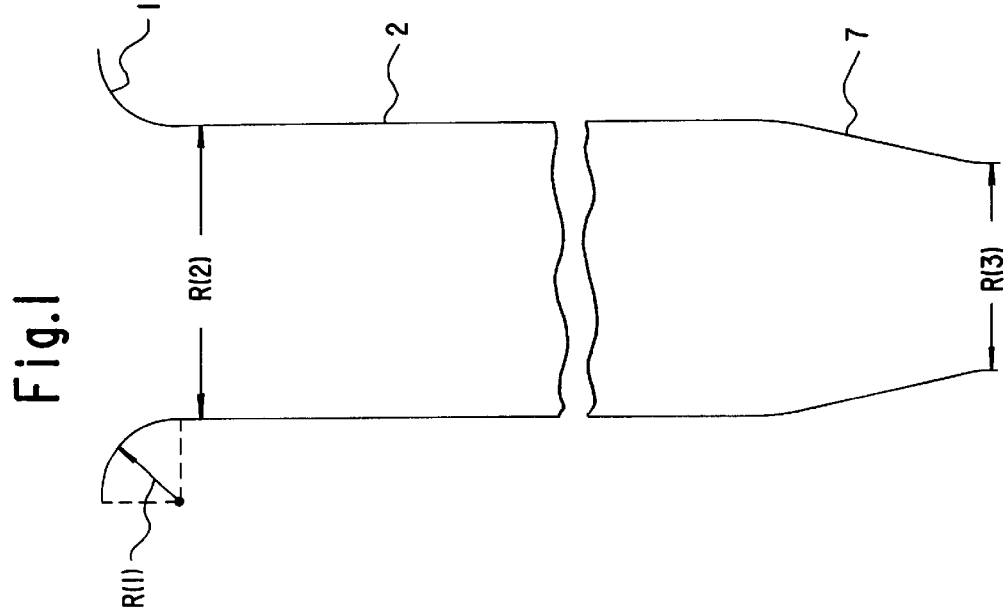

FIG. 1 is an explanatory cross-sectional view of a gas dispersion pipe in which its top end portion employs a contraction pipe structure with its horizontal cross-sectional area decreasing downward. The gas dispersion pipe shown in FIG. 1 is made up of a straight pipe portion (main pipe) 2, a contraction pipe portion 1 formed on the top end of the straight pipe portion and with its inner surface expanding up outward to form a curved surface, and a nozzle portion 7 formed at the bottom end of the straight pipe portion. While the inner circumferential surface of the contraction pipe portion 1 is preferably formed in an arcuate curved surface, the radius of curvature R(1) is in the range of $\frac{1}{20}$–$\frac{1}{1}$, preferably $\frac{1}{8}$–$\frac{1}{2}$ of the inner diameter of the straight pipe portion. The inner circumferential surfaces of the contraction pipe portion may be a curved surface other than an arcuate curved surface such as an elliptic curved surface as long as it continues smoothly to the straight pipe portion so as not to cause unnecessary pressure loss. The ratio R(3)/R(2) of the inner radius R(3) at the end of the nozzle portion 7 formed at the bottom end of the straight pipe portion to the inner radius R(2) of the straight pipe portion 2 is in the range of 0.4–0.8, preferably 0.5–0.75. The structure of the bottom end portion of the dispersion pipe of the structure shown in FIG. 1 may be, in addition to the nozzle structure shown in FIG. 1, a simple straight pipe structure, or a straight pipe structure with gas jet holes formed on the circumferential wall surface of the straight pipe.

In the dispersion pipe of the structure shown in FIG. 1, the contraction pipe portion 1 and the nozzle portion 7 are preferably formed to be detachable for replacement.

Figure 2:
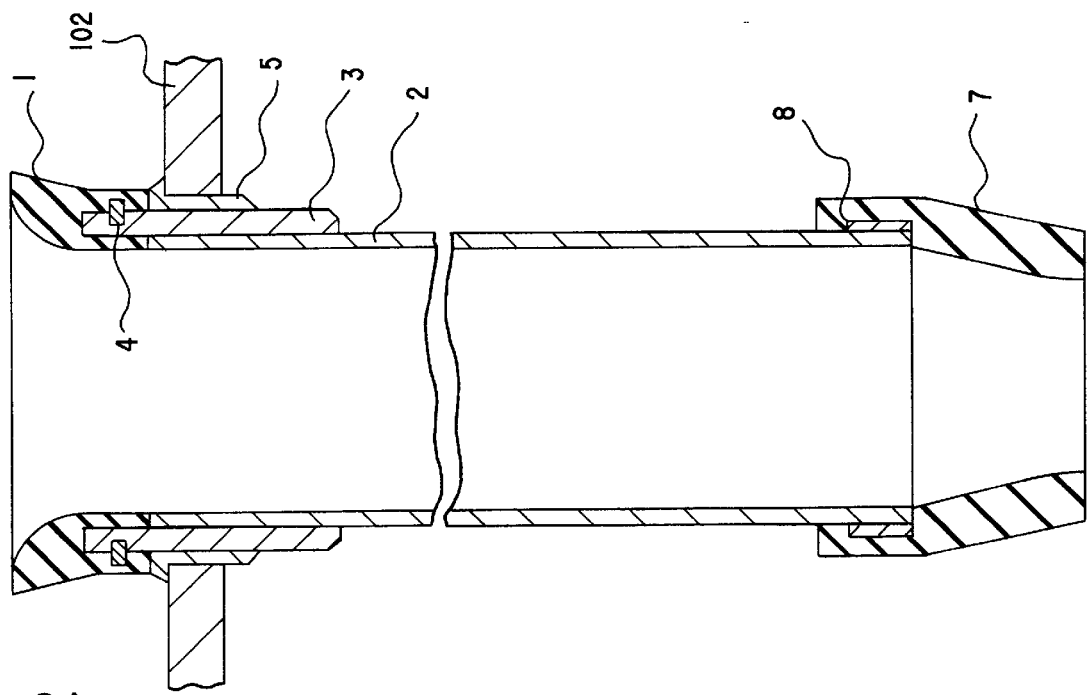
FIGS. 1–5 are explanatory drawings of a gas dispersion pipe in which its top end portion is formed in a contraction pipe structure with its horizontal cross-sectional area decreasing downward.

FIG. 2 shows a structure of the gas dispersion pipe with the contraction pipe portion formed on the top end of the straight pipe and the nozzle portion formed at the bottom end of the straight pipe, both formed to be detachable, in a state of the gas dispersion pipe being installed in a through hole formed through a partition plate. In the figure are shown, the contraction pipe 1, the straight pipe 2, a reinforcement pipe 3, a positioning ring 4, a cylindrical rubber elastic body 5, a partition plate 102, the nozzle 7, and a positioning reinforcement pipe 8.

The gas dispersion pipe shown in FIG. 2 as a whole is made up of the straight pipe 2, the contraction pipe 1 connected to the top end of the straight pipe 2, and the nozzle 7 connected to the bottom end of the straight pipe 2.

Figure 3A:
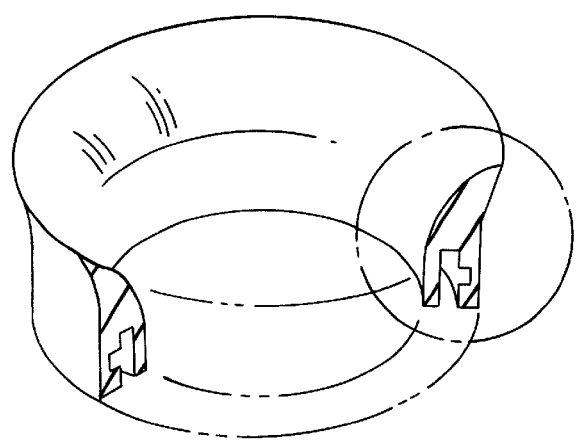
Figure 3B:
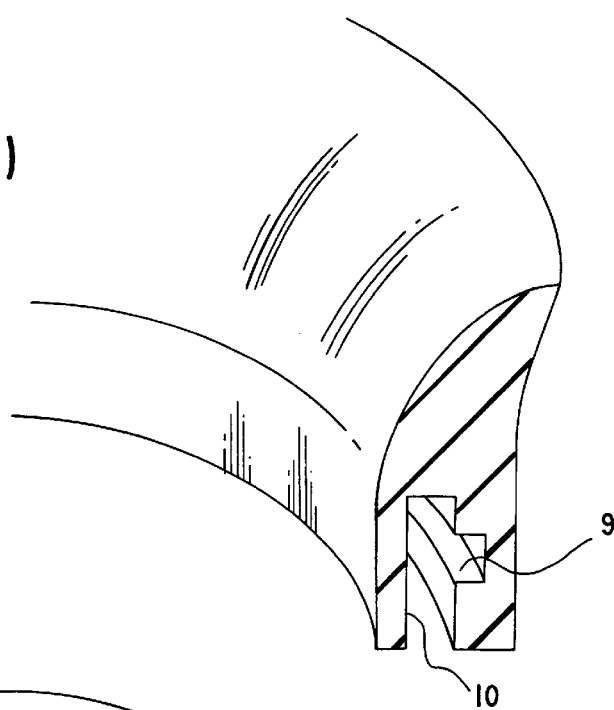

The contraction pipe 1 is formed in an arcuate curved surface with its inner circumferential surface extending up outward. FIG. 3(a) is a perspective view of the contraction pipe 1 and FIG. 3(b) is a partial enlarged view of FIG. 3(a). In FIGS. 3(a) and 3(b) are shown an annular vertical recess 10 formed vertically in the circumferential wall for detachably engaging with the end of the reinforcement pipe 3, and an annular groove 9 formed on the outer side of the circumferential walls of the annular vertical recess 10 for engaging with the positioning ring 4.

Figure 4:
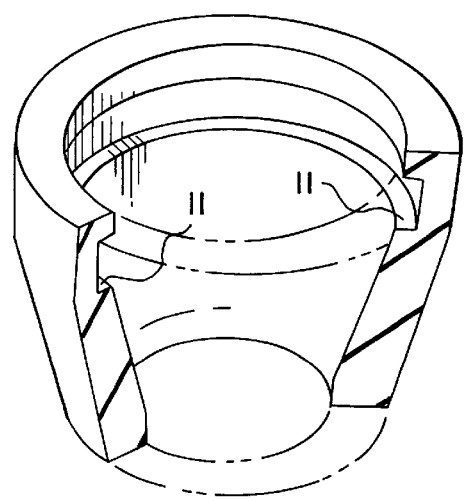

The nozzle 7 shown in a perspective view of FIG. 4 is made with a constricting taper. In FIG. 4 is shown an annular groove 11 formed on the upper inner circumferential wall of the nozzle for engaging with the positioning ring reinforcement pipe 8.

The reinforcement pipe 3 is made of a pipe having an inner diameter approximately the same as the outer diameter of the straight pipe portion 2. The former is fitted over the straight pipe 2 so that its top end is located above the top end of the straight pipe 2 and secured by bonding with adhesive. An annular groove for fitting the positioning ring 4 is formed on the outer circumferential wall near the top end of the reinforcement pipe 3.

The positioning reinforcement pipe 8 is made of a short pipe fitted over the bottom end portion of the straight pipe 2 and secured by bonding with adhesive.

The radius of curvature of the arc of the arcuate curved surface forming the inner circumferential surface of the contraction pipe 1 is in the range of $\frac{1}{20}$–1 of the inner diameter of the straight pipe portion, preferably $\frac{1}{8}$–$\frac{1}{2}$.

The diameter at the end of the nozzle 7 should be in the range of 0.4–0.8 of the inner diameter of the straight pipe portion 2, preferably 0.5–0.75.

The material for the contraction pipe 1 may be plastic or rubber, preferably rubber having good wear resistance and shock damping properties. The material for the straight pipe 2 may be metal or plastic, preferably hard plastic. The material for the nozzle 7 may be plastic or rubber, preferably wear-resistant rubber. The material for the reinforcement pipe 3) may be metal or plastic, preferably hard plastic. The material for the positioning reinforcement pipe 8 may be metal or plastic, preferably hard plastic.

To manufacture the gas dispersion pipe of the structure shown in FIG. 2, the straight pipe 2 is prepared with integrally bonded reinforcement pipe 3 and positioning reinforcement pipe 8, the contraction pipe 1 is connected to the top end of the straight pipe 2, and the nozzle 7 is connected to the bottom end of the straight pipe 2. To connect the contraction pipe 1 to the top end of the straight pipe 2, the annular positioning ring 4 is fitted into the annular groove formed on the outer circumferential surface near the top end of the reinforcement pipe 3, the annular recess 10 is aligned with the end of the reinforcement pipe 3, and the contraction pipe 1 is depressed. In this way, a state is obtained in which, as shown in FIG. 2, the end of the reinforcement pipe 3 is fitted into the annular recess 10 of the contraction pipe 1 and at the same time the projection of the positioning ring 4 is fitted into the annular groove 9 formed on the outer side of the inner circumferential surfaces of the annular recess 10 of the contraction pipe 1. The contraction pipe 1 connected to the top end of the straight pipe 2 in this way may be removed from the top end of the straight pipe 2 by pulling up the contraction pipe 1 as required.

The cross section of the annular positioning ring 4 may be circular, square, etc. and its material may be metal, plastic, rubber, etc.

To connect the nozzle 7 to the bottom end of the straight pipe 2, the bottom end of the straight pipe 2 is aligned with the top end opening of the nozzle 7 and the nozzle 7 is forced upward. In this way, a state is obtained in which, as shown in FIG. 2, the positioning reinforcement pipe 8 is fitted into the annular groove 11. The nozzle 7 connected to the bottom end of the straight pipe 2 in this way may be removed from the bottom end of the straight pipe 2 by pulling down the nozzle 7 as required.

The methods of connecting the contraction pipe 1 and the nozzle 7 to the straight pipe 2 are not limited to those described above but in essence any method may be used as long as the pipes can be freely connected and disconnected.

Figure 5:
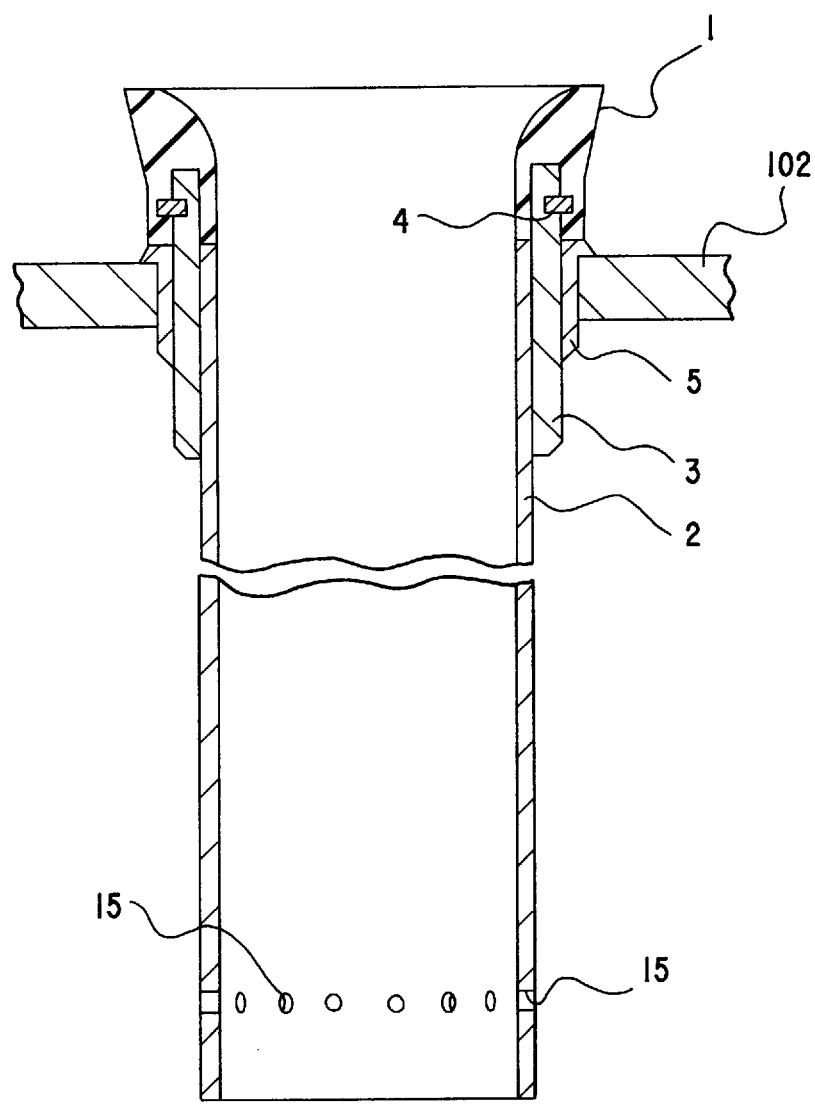

FIG. 5 shows a different gas dispersion pipe attached to a through-hole portion of a partition plate. The bottom end portion of the straight pipe 2 is similar to that shown in FIG. 2 but is provided, not with the nozzle, but with gas jet holes 15 formed through the circumferential wall in the bottom end portion of the gas dispersion pipe.

Since the top end portion of the gas dispersion pipes shown in FIGS. 2 and 5 are formed in the contraction pipe structure, when flue gas only, or a mixture of flue gas and absorption liquid particles, passes through the dispersion pipe, the flow of the flue gas only or mixture of flue gas and absorption liquid particles does not separate from the wall surface of the contraction pipe to produce eddy and its volume is smoothly reduced. As a result, unnecessary pressure loss is effectively prevented and the energy required to cause the flue gas only or mixture of flue gas and absorption liquid particles to flow through the dispersion pipe is saved.

The gas dispersion pipes shown in FIGS. 2 and 5 are very convenient. Since the contraction pipe forming the top end portion of the gas dispersion pipe can be freely attached or removed, when the contraction pipe is worn by collision of absorption liquid particles, it is not necessary to replace the entire gas dispersion pipe but only the contraction pipe has to be replaced. When the top end portion of the conventional gas dispersion pipe wears off and requires replacement, the entire gas dispersion pipe has to be replaced, requiring much expense and time. With the gas dispersion pipe described above, however, only the contraction pipe has to be replaced and therefore the replacement expense and time are considerably saved.

The gas dispersion pipe with its bottom end portion constituted with the nozzle as shown in FIG. 2 has an advantage of less pressure loss in comparison with the conventional gas dispersion pipe having gas jet holes formed through the circumferential wall near its bottom end as the flue gas only or the mixture of the flue gas and absorption liquid particles travels in a straight line through the pipe. When the flue gas only, or the mixture of the flue gas and absorption liquid particles, is made to flow through the conventional gas dispersion pipe, the flue gas or the mixture once flows vertically downward and then changes its flow direction horizontally and jets out from the gas jet holes provided on the circumferential wall. When the flow direction of the flue gas only or the mixture of the flue gas and absorption liquid particles flowing vertically downward is changed to the horizontal direction, a large pressure loss occurs in the gas dispersion pipe. With the gas dispersion pipe shown in FIG. 2, the flue gas only or the mixture of flue gas and absorption liquid particles flows straight without changing its path and is directly blown into the absorption liquid and therefore, unlike with the conventional gas dispersion pipe, no pressure loss occurs because of the change in the flow direction of the flue gas only or the mixture.

Furthermore, the gas dispersion pipe of the constitution shown in FIG. 2 is very easy to be attached to the partition plate because its contraction pipe and the nozzle are freely attached to and removed from the straight pipe portion.

FIGS. 6 through 14 show examples of gas dispersion pipes each having a gas guide member within the bottom end portion of the dispersion pipe to expand the gas flow in the (straight) main pipe to the obliquely outward direction near the outlet of the main pipe.

Figure 6:
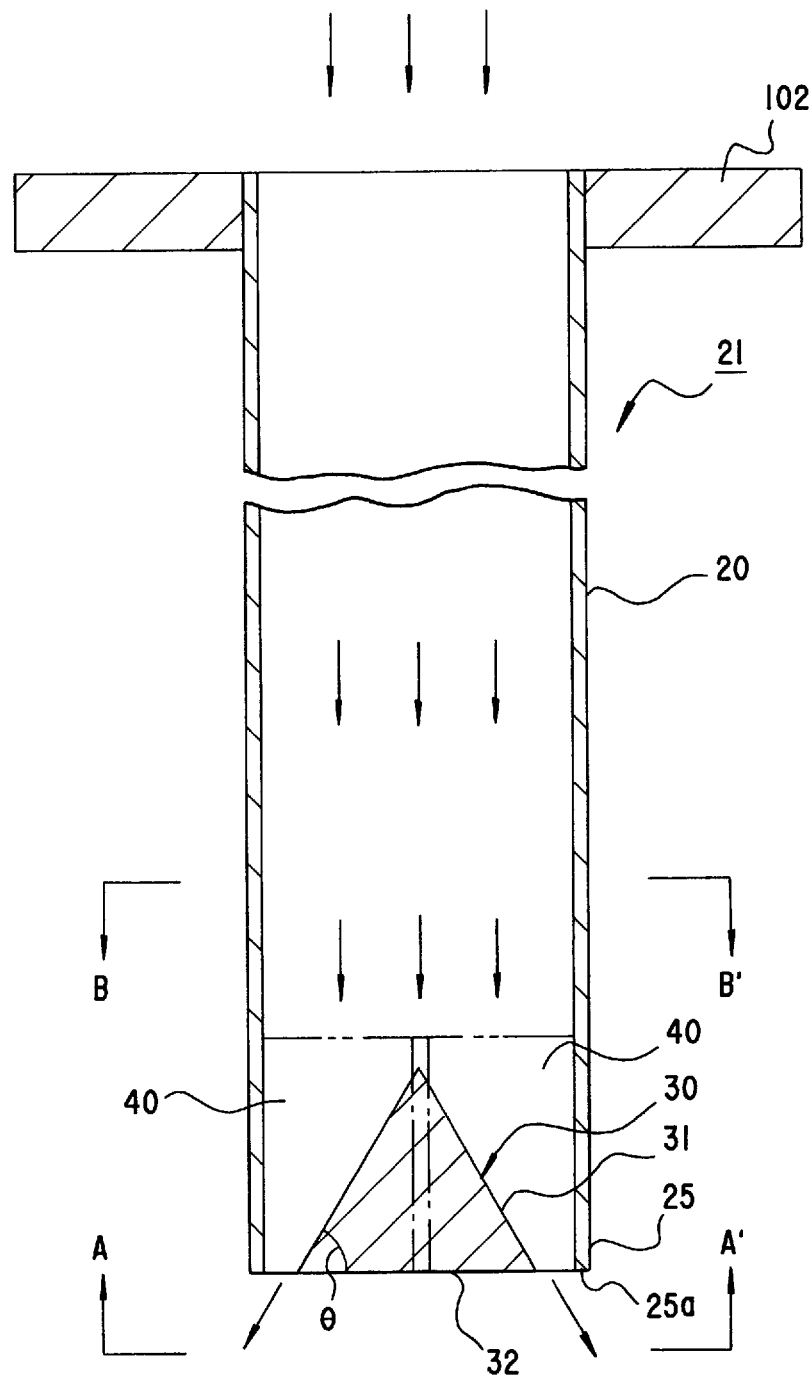
FIGS. 6–14 are explanatory drawings of a gas dispersion pipe in which a gas guide member with its horizontal cross-sectional area increasing downward is arranged within the bottom portion of the pipe.
Figure 7:
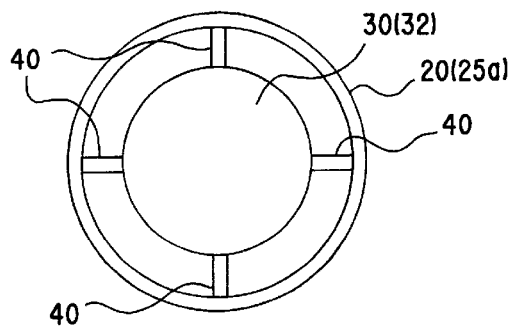
Figure 8:
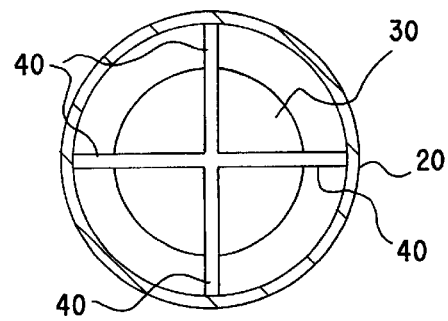

FIGS. 6 through 8 show an embodiment of the gas dispersion pipe with a gas guide member disposed within the bottom end portion of the pipe.

FIG. 6 is a cross-sectional view of a gas dispersion pipe 21 of this invention attached to a partition plate 102. FIG. 7 shows a cross section taken along the line A–A' in FIG. 6 and FIG. 8 shows a cross section taken along the line B–B' in FIG. 6.

The gas dispersion pipe 21 comprises a hollow main pipe 20 and a gas guide member 30 with its horizontal cross-sectional area increasing downward and disposed within the gas outlet side 25 end. The main pipe 20 is usually a straight pipe with its diameter being about 25–250 mm and length about 500–5000 mm.

The gas guide member 30 is provided for changing the direction of the gas flow at the main pipe outlet to the obliquely outward direction and is formed as a symmetrical body of revolution having a sloped surface 31 with its horizontal cross-sectional area increasing downward. More specifically, any symmetrical body of revolution may be used such as a cone, a paraboloid of revolution, a sphere, or a lower single nappe hyperboliod of revolution.

The slope angle $\theta$ of the sloped surface of the guide member 30 relative to the horizontal plane (base surface) is greater than zero degree and smaller than 90 degrees, preferably 15°–75°, more preferably 30°–600°. Any angle may be optionally selected within that range. In the embodiment in FIG. 6, a conical body is shown with the slope angle of $\theta=60°$. In this case, a cylinder of a certain length and the same diameter as the diameter of the base of the conical body 30 may be connected to the base of the conical body 30 to protect the base from wear. Or, an inverted conical member having the same base diameter as that of the conical body 30 may be arranged so that their bases come in contact with each other. By bringing such an inverted conical body into contact with the underside of the conical body 30, a dead space below the conical body 30 is eliminated so that the gas which jets out from the gas outflow holes at the bottom end of the gas dispersion pipe is efficiently brought into contact with liquid.

The greater the slope angle $\theta$ of the slope surface 31, the better becomes downward jet diffusion of the gas. Therefore, this gas dispersion pipe is suited for a large flow rate of gas to be treated by each pipe. When the flow rate of the gas to be treated by each pipe is large, collision is likely to occur between gas flows from gas dispersion pipes adjacent to each other and gas-liquid contact efficiency lowers. With the gas dispersion pipe of this invention, however, such a problem does not occur. It is preferable to select an optimum gas jet direction by suitably changing the slope angle $\theta$ of the slope surface 31 or the shape of the symmetrical body of revolution according to the flow rate of the gas to be treated.

The cross-sectional area of the opening at the outlet of the main pipe 20 is set to 20–80%, preferably 30–75% of the cross-sectional area of the hollow main pipe 20 by the insertion of the gas guide member 30. With such a setting, the gas jetted from the gas outlet end of the main pipe 20 flows faster than the gas in the straight pipe portion of the main pipe 20 and favorable gas-liquid contact in the liquid is attained.

The gas guide member 30 may be secured by plate arms 40 extending radially from the center line of the hollow main pipe 20. The number of the plate arms 40 is usually from 4 to 32 when each of the plate arms 40 are assumed, as shown in the drawing, to have the length extending from the center line of the hollow main pipe 20 to the pipe wall. The number may be optionally selected in view of the diameter and necessary strength of the main pipe 20. The thickness of the plate arm 40 at the gas jet outlet is preferably 5 mm or more so that flows of gas from adjacent jet openings do not collide with each other. In the area other than the vicinity of the jet outlet, the thickness of the plate arm 40 need not be constant but may vary from location to location so that the flow lines of the gas shown with the arrow, for example, become smooth. The length of the plate arms 40 along the axial direction may be arbitrary.

Thus, the gas dispersion pipe 21 shown in FIG. 6 basically comprises the main pipe 20 and the gas guide member 30 disposed within one end of the main pipe 20 and is secured by the plate arms 40. The material for the gas guide member and the plate arms may be metal, plastic, etc., most preferably hard plastic. The gas guide member 30 and the plate arms 40 may be formed integrally by injection molding or may be made separately and bonded together. Alternatively, the plate arms 40 may be made to penetrate the main pipe 20 and the gas guide member 30 for the securing.

In the gas dispersion pipe 21 shown in FIG. 6, the bottom end surface 25a of the main pipe 20 and the base surface 32 of the conical gas guide member 30 are formed to be in the same horizontal plane.

Figure 9:
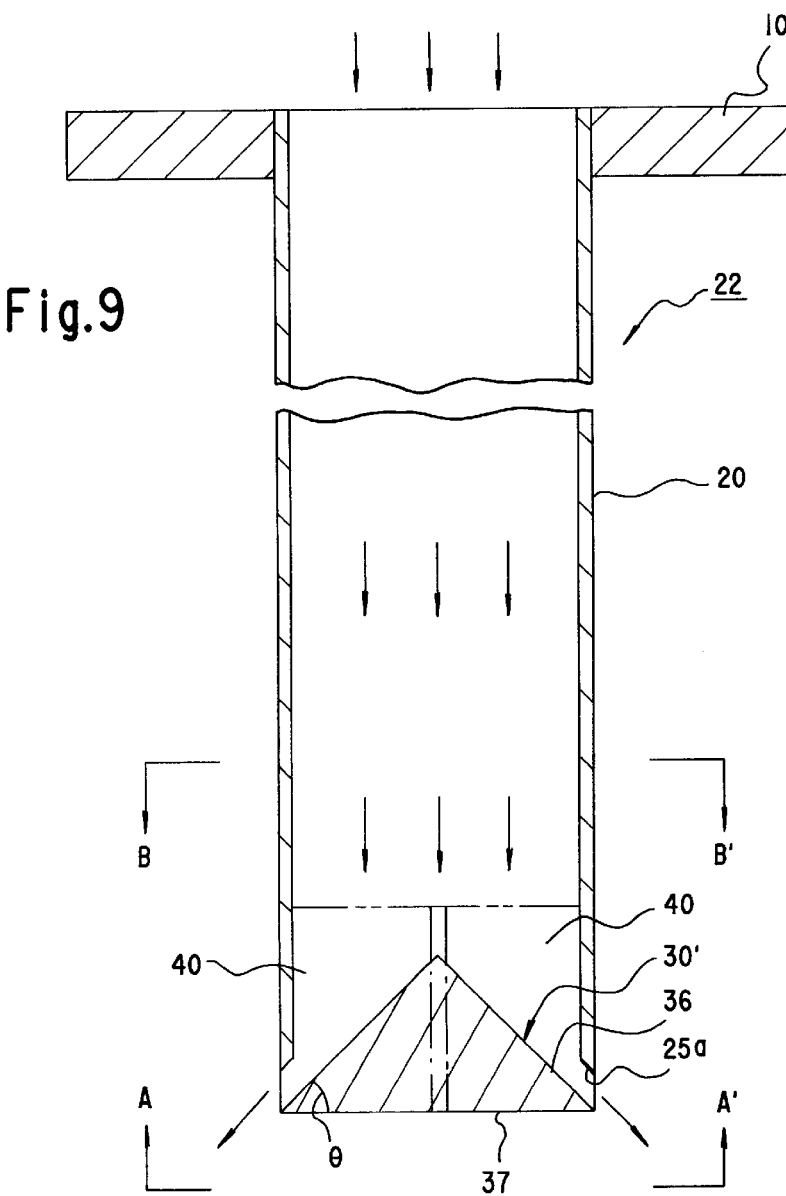
Figure 10:
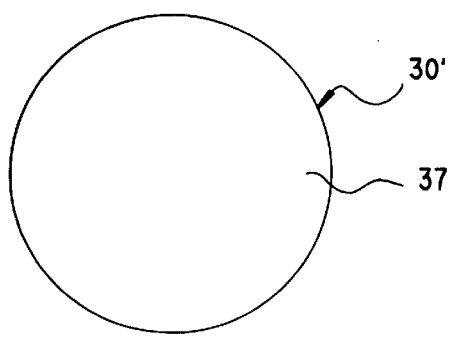
Figure 11:
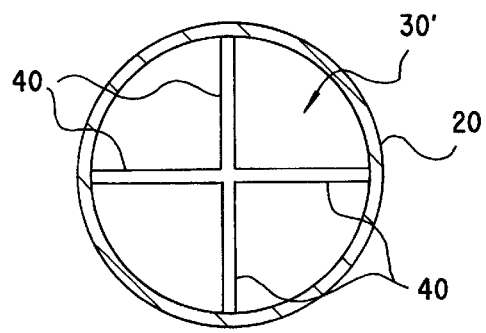

FIGS. 9–11 show another embodiment of the gas dispersion pipe with the gas guide member disposed within the bottom end portion of the gas dispersion pipe.

The gas dispersion pipe 22 shown in FIGS. 9–11 is different from the gas dispersion pipe 21 of the previous embodiment with respect to the shape and positional arrangement of its gas guide member. That is to say, in the gas dispersion pipe 22 of this embodiment, the base surface 37 of the gas guide member 30' extends downward beyond the bottom end 25a. In this case, the diameter of the base surface 37 of the gas guide member 30' is set to be equal to the outer diameter of the main pipe 20. Here, those diameters need not be set exactly the same but the diameter of the base surface 37 of the gas guide member 30' may be set within the range of 80–120% of the outer diameter of the main pipe 20. The amount of extension of the base surface 37 of the gas guide member 30' beyond the bottom end 25a of the main pipe 20 may be appropriately determined in view of obstruction caused by the base surface 37 against turbulent flow dispersion of absorption liquid.

While the slope angle θ of the slope surface 36 of the gas guide member 30' exemplified by a cone in this embodiment is set to 45°, any angle may be set within the same range as described above. Since the smaller the angle θ, the better the gas jet diffusion in the horizontal direction, the gas dispersion pipe of this embodiment is suited when the treated gas flow rate per each gas dispersion pipe is small. In this case too, an optimum gas jet direction may be selected by changing the slope angle θ of the slope surface of the gas guide member 30' or the shape of the symmetrical body of revolution according to the flow rate of the gas to be treated.

The cross sectional area of the portion where the opening cross-sectional area at the gas outlet end of the main pipe 20, or the opening cross-sectional area surrounded by the bottom end portion 25a of the main pipe 20 and the slope surface 36 of the gas guide member 30', becomes the smallest, is preferably set to 20–80%, more preferably 30–75% of the cross-sectional area of the main pipe 20. This makes it possible to jet the gas at a speed faster than that in the straight pipe portion of the main pipe 20 into the liquid to attain favorable gas-liquid contact state.

The flow rate of the gas to be treated per each gas dispersion pipe is determined from the diameter of the gas dispersion pipe, concentrations of pollutants such as sulfur dioxide gas and dust to be removed from the gas, removal rate of the pollutants, and economy. As is clear from the above description, a great advantage provided by this invention is that the optimum gas jet direction and jet speed are optionally selected according to the flow rate of the gas to be treated. This in turn means that a gas dispersion pipe for gas-liquid contact is provided which can be applied to a wide range of gas flow rates to be treated.

Figure 12:
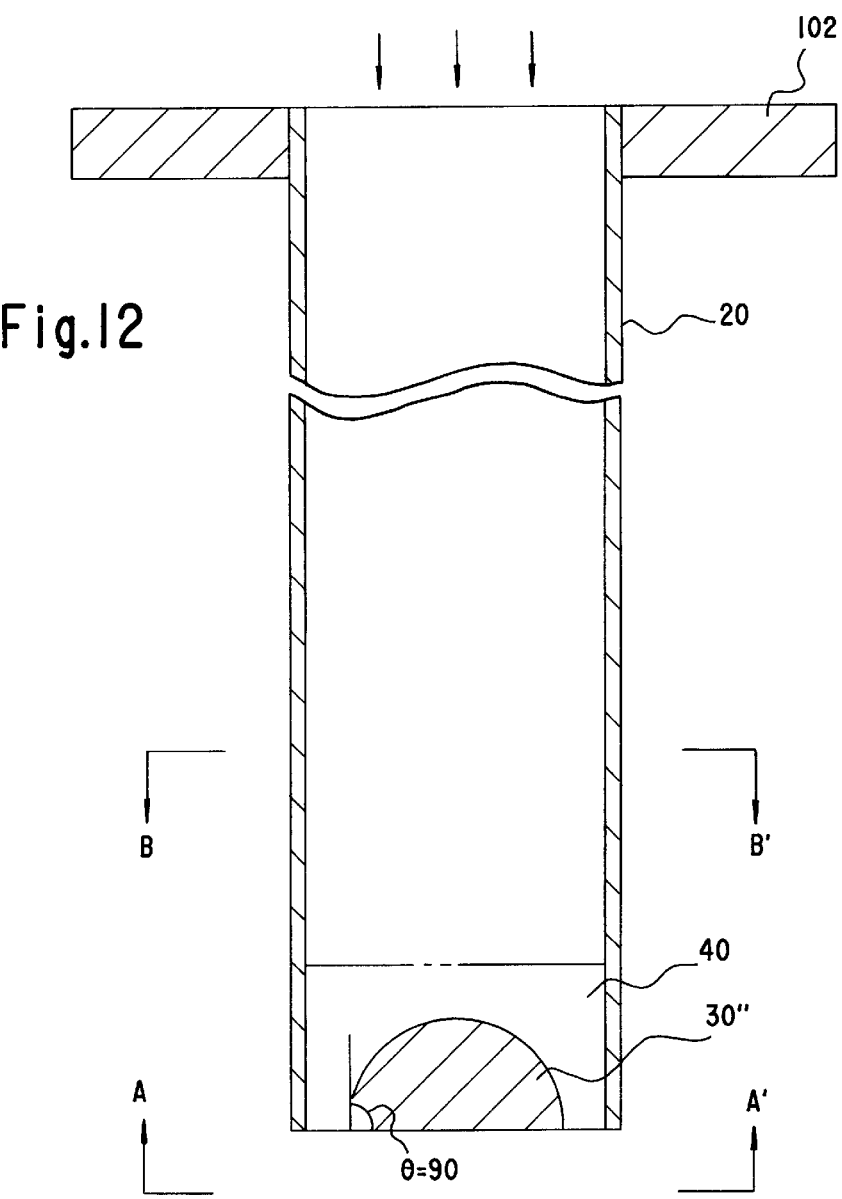
Figure 13:
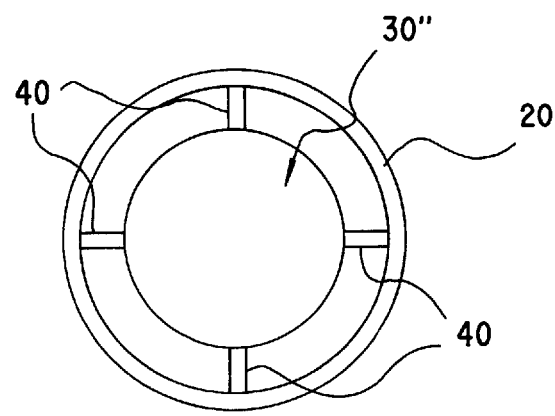
Figure 14:
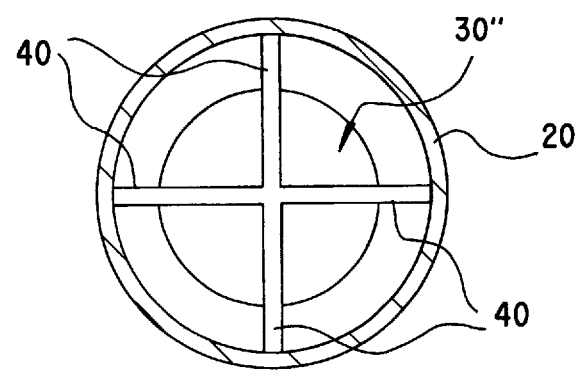

FIGS. 12 through 14 show still another embodiment of the gas dispersion pipe with a gas guide member disposed within the bottom end portion of the pipe. In those drawings, a symmetrical body of revolution 30" in a hemispherical shape is shown as the gas guide member with the slope angle θ being 90°.

While the top end portion of the gas dispersion pipes shown in FIGS. 6 through 14 is formed in the structure of a straight pipe, it is preferable to form the top end portion in a contraction pipe structure with its horizontal cross-sectional area decreasing downward.

Figure 15:
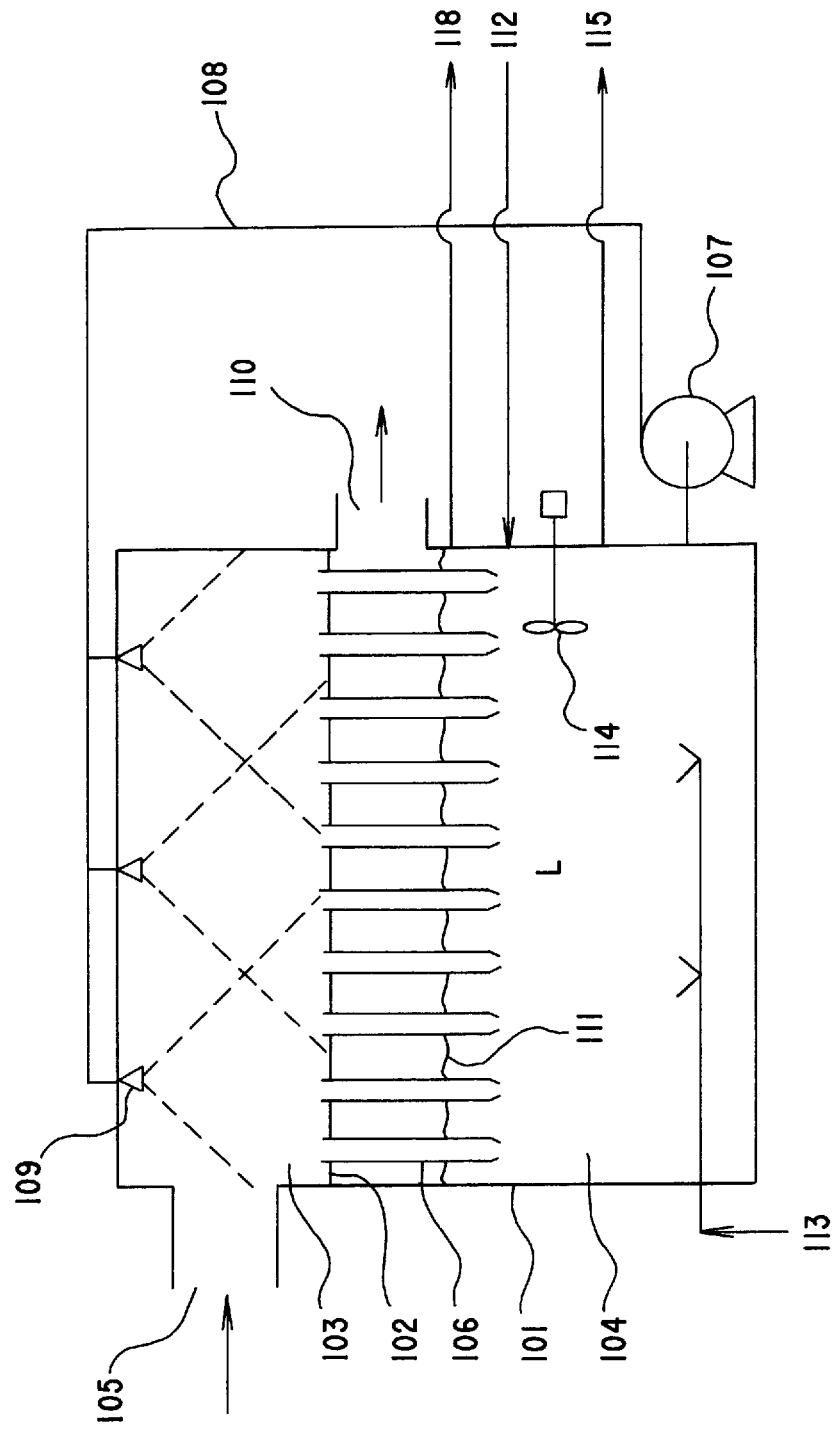

FIG. 15 is a schematic view of an example of the gas-liquid contact device provided with the gas dispersion pipe of this invention. This device is specially suited as a flue gas treatment device for removing sulfur dioxide gas from the flue gas containing the sulfur dioxide gas. FIG. 15 shows; a sealed container 101, a partition plate 102, a second chamber 103, a first chamber 104, a flue gas inlet 105, gas dispersion pipes 106, an absorption liquid circulation pump 107, an absorption liquid circulation line 108, absorption liquid sprayers 109, a cleaned flue gas outlet 110, a gas-liquid interface 111, an absorption liquid makeup line 112, an oxidation air supply line 113, an absorption liquid agitator 114, a line 115 for discharging absorption liquid from the first chamber 104, and a scum removal line 118.

The device shown in FIG. 15 is constituted as a whole with a large sealed container with its interior divided by the partition plate 102 into the first chamber 104 and the second chamber 103 adjacent above the first chamber 104. The partition plate 102 is provided with a plural number of through holes, each provided with a gas dispersion pipe 106. The partition plate 102 may be horizontal, stepped, or slightly sloped. The shape of the horizontal cross section of the container 101 may be circular or rectangular.

In the upper portion of the second chamber 103 are disposed sprayers 109 as absorption liquid spraying means. A flue gas inlet 105 is provided on the circumferential wall of the second chamber 103. When the first chamber is in a cylindrical shape, the second chamber is preferably in a hemispherical shape because its volume and the material cost become the minimum. When the first chamber is angular, the second chamber is preferably in the shape of an obelisk.

The first chamber 104 holds absorption liquid L. The upper wall surface of the first chamber 104 is provided with an outlet 110 for the cleaned flue gas.

A circulation line 108 for circulating the absorption liquid in the first chamber to the sprayers 109 in the second chamber is provided between the first chamber 104 and the sprayers 109. The circulation line 108 is provided with a circulation pump 107. When the flue gas entering the second chamber is cooled in advance by the contact with cooling water, the sprayers 109 and the absorption liquid circulation line 108 are not necessarily required.

In FIG. 15 designated as 112 is an absorption liquid makeup line, as 115 is a line for drawing absorption liquid from the first chamber 104, as 118 is a scum removal line, as 114 is an agitator for agitating the absorption liquid and as 113 an oxygen or oxygen-containing gas supply line for use in supplying oxygen into the absorption liquid.

The flue gas cleaning treatment using the device shown in FIG. 15 is carried out as follows: The absorption liquid L held in the first chamber 104 is sent through the circulation line 108 provided with the circulation pump 107 to the sprayers 109 in the second chamber 103, and sprayed by the sprayers 109 uniformly within the second chamber 103. While the absorption liquid L is being sprayed, the flue gas is sent through the inlet 105 of the second chamber 103 into the second chamber 103. The flue gas temperature may be usually 80°–300° C. The flue gas supplied into the second chamber 103 comes into mixing contact with absorption liquid particles (with mean particle diameter of 200–4000 micrometers) formed by the spraying of the absorption liquid. As a result, the flue gas is cooled and gaseous chemical pollutants and solid particles, such as dust (hereafter simply referred to as pollutants), contained in the flue gas are captured by the absorption liquid particles and removed from the flue gas. Although part of the absorption liquid stagnates on the partition plate 102, it flows into the gas dispersion pipe 106 to form a gas-liquid mixed phase flow.

When part of the absorption liquid held in the first chamber 104 is circulated through the circulation line 108 to the sprayers 109, the absorption liquid drawn from the first chamber may be circulated either directly to the sprayers 109 or, after improving the property of the absorption liquid, by adding makeup water or fresh absorption agent, to the sprayers 109. In a case where the absorption liquid is in the form of a slurry of the absorption agent and has a high solid component content, it is possible to circulate the absorption liquid to the sprayers after removing the solid component in advance by filtering or centrifugal separation.

The amount of the absorption liquid sprayed from the sprayers 109 is usually 0.2–10 kg/hr, preferably 0.5–5 kg/hr, per 1 m$^3$/hr of the supplied flue gas converted to the standard conditions. The flue gas may be cooled down to a temperature below the dew point of the flue gas by spraying such an amount of the absorption liquid as described above. The cooling of the flue gas in this case is effected by the contact of the flue gas with the absorption liquid particles and by the evaporation heat as part of the liquid in the absorption liquid particles evaporates during the contact. About 20% or more by weight of pollutants contained in the flue gas is removed by the mixing contact of the flue gas with the absorption liquid particles.

The mixture of the flue gas and the absorption liquid particles formed within the second chamber 103 is distributed to the gas dispersion pipes 106 disposed at the through holes of the partition plate 102, flows through the dispersion pipes in gas-liquid mixed phase, and blows into the absorption liquid in the first chamber 104 where the mixture comes into contact with the absorption liquid again.

When the mixture of the flue gas and the absorption liquid particles flows from the second chamber 103 into and through the dispersion pipe 106, relative speed of the gas and liquid increases and the contact between the flue gas and the absorption liquid particles becomes more effective. From this viewpoint, a faster flue gas flow speed through the dispersion pipe is more preferable.

The flow speed of the flue gas through the dispersion pipe 106 can be adjusted by the number of through holes provided on the partition plate 102, the inner diameter of the dispersion pipes disposed at the through holes, and amount and pressure of the flue gas supplied to the second chamber. In this invention, the flow speed of the flue gas through the dispersion pipe is not less than 10 m/sec, preferably not less than 15 m/sec in the linear speed through the cross-sectional area of the pipe. The content of the absorption liquid particles in the mixture flowing through the dispersion pipe is 0.2–10 kg, preferably 0.5–5 kg per 1 m$^3$ of the flue gas converted to the standard conditions. The content of the absorption liquid particles in the mixture can be controlled by the amount of the absorption liquid sprayed from the sprayers 109 or the amount of the flue gas supplied to the second chamber 103.

When the flue gas in the form of mixture with the absorption liquid particles is made to flow through the dispersion pipe at a high speed as described above, closer contact between the flue gas and the absorption liquid particles is obtained so that the gaseous pollutants and solid state particles are captured by the absorption liquid particles and removed from the flue gas. In this invention, the ratio of the pollutants removed through the dispersion pipe is at least 20% of the total amount of pollutants removed by the device.

While the flue gas blown through the end portion of the gas dispersion pipe 106 into the absorption liquid L rises up in bubbles through the absorption liquid, pollutants and solid state particles remaining in the flue gas are captured by the absorption liquid and removed from the flue gas. In this way, the cleaned flue gas with its pollutants and solid particles removed is released from the gas-liquid interface 111 into the space above the interface 111 and discharged through the outlet 110 to the exterior of the container.

When the mixture of the flue gas and the absorption liquid particles is blown as a gas-liquid mixed phase flow into the absorption liquid, it is preferable to blow the gas-liquid mixed phase flow into the absorption liquid at a high speed by making the dispersion pipe end portion in a nozzle structure as shown in FIGS. 1 and 2, or by disposing a gas guide member within the pipe end portion as shown in FIGS. 6–14. When the gas-liquid mixed phase flow is blown at a high speed from the dispersion pipe end into the absorption liquid, an advantage is obtained that the gas-liquid mixed phase flow, because of its greater density, reaches deeper into the absorption liquid than the gas flow. In other words, a higher pollutant removal rate is obtained with this arrangement than with the conventional flue gas treatment under the same pressure loss conditions. Furthermore, when the gas-liquid mixed phase flow is blown into the absorption liquid at a high speed, violent wavy movement (sloshing) on the absorption liquid surface is prevented. The speed of the gas-liquid mixed phase flow can be controlled by the cross-sectional area of the gas dispersion pipe end opening through which the flue gas flows out. In this invention, the flue gas speed in the gas-liquid mixed phase flow from the gas dispersion pipe end at the time of maximum treatment of the flue gas is not less than 25 m/sec, preferably not less than 30 m/sec. The flue gas flow speed referred to above is the flow speed based on the outflow opening cross-sectional area at the gas dispersion pipe end.

In FIG. 15, it is arranged that the cleaned flue gas which has passed through the gas-liquid interface 111 and separated from the absorption liquid L is discharged outside through the outlet 110 provided on the circumferential wall of the first chamber 104. However, it may also be arranged that a third chamber is arranged adjoining over the second chamber 103 and the third chamber is connected to the first chamber through a communication pipe so that the flue gas is introduced from the first chamber to the third chamber and discharged outside the container. Such an arrangement is shown in FIG. 16.

In FIG. 16 are shown the third chamber 121 and a partition plate 122 isolating the second and third chambers from each other. The partition plate 122 may be horizontal, sloped with any gradient or with bends. A communication pipe 123 makes communication between the first and third chambers. Of the symbols shown in FIG. 16, those identical to those shown in FIG. 15 denote like parts. According to this invention, the absorption liquid may be sprayed also in the third chamber as required. In that case, the mixture of the absorption liquid particles and the flue gas is discharged from the outlet 110 provided on the third chamber and introduced into a mist separator (not shown) where the absorption liquid particles are removed. After the absorption liquid particles are removed, the cleaned flue gas is discharged into the atmosphere.

In the flue gas treatment described above, the flue gas is first cleaned by the contact with a relatively large amount of absorption liquid sprayed in particle state (first cleaning process), then cleaned by close contact with the absorption liquid particles in the dispersion pipe (second cleaning process), and finally cleaned by contact with the absorption liquid as it is blown in bubbles into the absorption liquid (third cleaning process). In such a flue gas treatment, since the pollutant removal rate is high in the primary and secondary cleaning processes, there may be cases, depending on the type of the flue gas, in which a desired pollutant removal rate is almost attained already in the primary and secondary cleaning processes. In that case, a small pollutant removal rate in the third process suffices, a small amount of absorption liquid suffices, and the first chamber may be on a small scale so that the entire device can be made small. Furthermore, in that case, the dispersion pipe end may be located shallow (for example 0–10 cm) in the absorption liquid or above (for example 0–30 cm) the absorption liquid surface. When the dispersion pipe end is located above the absorption liquid surface, the mixed phase flow of the flue gas and the absorption liquid particles flowing out from the dispersion pipe end collides with the absorption liquid surface, and the absorption liquid particles contained in the mixed phase flow are taken into the absorption liquid. On the other hand, the flue gas collides with the absorption liquid surface and is cleaned by the contact with the surface portion of the absorption liquid. When the gas dispersion pipe end is in a shallow position in the absorption liquid or above the absorption liquid surface, the pressure required for flowing through the dispersion pipe is very small.

The type of the absorption liquid used in this invention is suitably selected according to the type of the flue gas from various types conventionally known. When the pollutants in the flue gas are acid substances such as $SO_2$, $SO_3$, NO, $N_2O_3$, $NO_2$, $N_2O_4$, $N_2O_5$, $CO_2$, HCl, and HF, solution or slurry containing alkaline substances such as alkali metals and alkaline earth metals is used as the absorption liquid. In particular, calcium hydroxide slurry and calcium carbonate slurry are preferably used. When calcium hydroxide slurry and calcium carbonate slurry are used as the absorption liquid, these calcium compounds react with sulfur dioxide gas to form calcium sulfite. In that case, the calcium sulfite can be converted to calcium sulfate (gypsum) by introducing air or oxygen into the absorption liquid. When the pollutants in the flue gas are alkali substances such as ammonia water, acid water solution may be used as the absorption liquid.

EMBODIMENTS

The present invention will be described further in detail by way of examples.

EXAMPLE 1

A flue gas treatment test was carried out using the gas-liquid contact device (gas treatment device) of a two chamber type shown in FIG. 15. The sealed container 101 comprised the first chamber of a cylindrical shape and the second chamber of a hemispherical shape. The flue gas used for treatment was coal boiler flue gas of 120° C. containing 500 mg/Nm$^3$ of dust and 2000 vol ppm of sulfur dioxide gas. The absorption liquid used was slurry liquid containing calcium carbonate. The gas dispersion pipe 106 used was of the constitution shown in FIG. 2. The inner diameter of the straight pipe 2 was 150 mm, and the inner circumferential surface of the contraction pipe 1 was formed in an arcuate shape with the diameter of curvature of 25 mm. The inner diameter of the nozzle 7 was 105 mm. The number of the gas dispersion pipes disposed was 11 per 1 m$^2$ of the partition plate 102. Major operating conditions in the flue gas treatment were as follows:

(1) Flue gas supply rate at the flue gas inlet: 100,000 Nm$^3$/h
(2) Spray rate of absorption liquid from the sprayers 109: 200 t/h
(3) Cooling temperature of flue gas in the second chamber 103 (dew point temperature of the flue gas): 48° C.
(4) Linear speed of gas in the gas-liquid mixed phase flow in the straight pipe portion 2 (FIG. 2) of the dispersion pipe: 20 m/sec
(5) Amount of absorption liquid in the mixed phase flow: 2 kg per 1 Nm$^3$ of flue gas
(6) Linear speed of gas in the gas-liquid mixed phase flow coming out from the nozzle 7 (FIG. 2) of the dispersion pipe: about 40 m/sec
(7) Absorption liquid supply rate from the line 112: 11 t/h
(8) Absorption liquid outflow rate from the line 115: 7 t/h
(9) Air supply rate from the line 113: 2300 Nm$^3$/h
(10) Properties of gas at the cleaned flue gas outlet 110:
  (i) Sulfur dioxide gas concentration: 95 vol ppm
  (ii) Amount of dust: 10 mg/Nm$^3$

EXAMPLE 2

The arrangement was the same as the first embodiment except the gas dispersion pipe of the structure shown in FIG. 5 was used as the gas dispersion pipe 106 and a flue gas treatment test was carried out. In the gas dispersion pipe, the inner diameter of the straight pipe portion was 150 mm, the radius of curvature of the arcuate inner circumferential surface of the contraction pipe 1 was 25 mm, the diameter of the gas jet hole 15 was 34 mm, and the number of the gas jet holes was 12.

In the test, the linear speed of the gas-liquid mixed phase flow coming out through the gas jet holes 15 was 32 m/sec, the concentration of sulfur dioxide gas and the amount of dust in the cleaned flue gas were 93 vol ppm and 12 mg/Nm³, respectively.

EXAMPLE 3

The arrangement was the same as the first embodiment except the gas dispersion pipe 21 of the structure shown in FIG. 6 was used in place of the gas dispersion pipe 106 and a flue gas treatment test was carried out in a similar manner. The main pipe of the dispersion pipe was 100 mm in inner diameter and 3,000 mm in length. The gas guide member 30 inserted within the gas outlet portion of the main pipe 20 was in a conical shape with the slope angle θ of the slope surface 31 being 60°, and the cross-sectional area of the gas outflow hole at the gas outlet portion of the main pipe was 50% of the cross-sectional area of the hollow main pipe 20. The number of the gas dispersion pipes disposed was 16 per 1 m² of the partition plate 102.

Major operating conditions in the flue gas treatment were; flue gas supply amount of 100,000 Nm³/h at the flue gas inlet, spray amount of 100 t/h of absorption liquid from sprayers 109, flue gas cooling temperature of 48° C. (dew point temperature of flue gas) in the second chamber 103, gas linear speed of 18 m/sec in gas-liquid mixed phase flow through the straight pipe portion 20 of the gas dispersion pipe 106, absorption liquid amount of 1 kg per 1 Nm³ of flue gas in the mixed phase flow, gas linear speed of about 36 m/sec in gas-liquid mixed phase flow from the outlet of the gas dispersion pipe 106 (21), absorption liquid supply amount of 11 t/h from absorption liquid makeup line 112, absorption liquid outflow amount of 7 t/h from the absorption liquid discharge line 115, and air supply amount of 2300 Nm³/h from the oxygen or oxygen-containing gas supply line 113.

As a result of the test, the sulfur dioxide gas concentration at the cleaned flue gas outlet 110 was 95 ppm (vol) and the dust amount 10 mg/Nm³.

COMPARATIVE EXAMPLE 1

Test arrangement was the same as that of the third embodiment except the gas guide member 30 disposed within the gas outlet portion was removed and other parts were left unchanged, and a test was carried out under the same conditions as those of the third embodiment. As a result of the test, the sulfur dioxide gas concentration at the cleaned flue gas outlet 110 was 225 ppm (vol) and the dust amount 50 mg/Nm³.

EXAMPLE 4

Using the third embodiment, the structure of the gas guide member 30 and the flue gas supply amount were changed. That is to say, the gas guide member 30 was made conical with the angle θ of the slope surface 31 being 75°, and the cross-sectional area of the gas outlet holes at the gas outlet end portion of the main pipe was made 55% of the cross-sectional area of the hollow main pipe. The flue gas supply amount was set to 120,000 Nm³.

As a result of the test, the sulfur dioxide gas concentration at the cleaned flue gas outlet 110 was 95 ppm (vol) and the dust amount 10 mg/Nm³.

COMPARATIVE EXAMPLE 2

Test arrangement was the same as that of the fourth embodiment except the gas guide member 30 disposed within the gas outlet portion was removed and other parts were left unchanged, and a test was carried out under the same conditions as those of the fourth embodiment. As a result of the test, the sulfur dioxide gas concentration at the cleaned flue gas outlet 110 was 260 ppm (vol) and the dust amount 60 mg/Nm³.

EXAMPLE 5

Using the third embodiment, the structure of the gas guide member 30 and the flue gas supply amount were changed. That is to say, the gas guide member 30 was made conical with the angle θ of the slope surface 31 being 60°, and the cross-sectional area of the gas outlet hole at the gas outlet end portion of the main pipe was made 45% of the cross-sectional area of the hollow main pipe. The flue gas supply amount was set to 80,000 Nm³.

As a result of the test, the sulfur dioxide gas concentration at the cleaned flue gas outlet 110 was 95 ppm (vol) and the dust amount 8 mg/Nm³.

COMPARATIVE EXAMPLE 3

Test arrangement was the same as that of the fifth embodiment except the gas guide member 30 disposed within the gas outlet portion was removed and other parts were left unchanged, and a test was carried out under the same conditions as those of the fourth embodiment. As a result of the test, the sulfur dioxide gas concentration at the cleaned flue gas outlet 110 was 190 ppm (vol) and the dust amount 40 mg/Nm³.

EXAMPLE 6

Using the third embodiment, the structure and arrangement of the gas guide member 30 were changed as shown in FIG. 9. That is to say, the gas guide member 30' was made conical with the angle θ of the slope surface 31 being 45°, and the cross-sectional area of the gas outlet hole at the gas outlet end portion of the main pipe was made 50% of the cross-sectional area of the hollow main pipe. The distance between the bottom end surface of the main pipe 20 and the base of the conical body (protruding distance of the base of the conical body) was made about 16 mm, and the other parts were left unchanged.

As a result of the test, the sulfur dioxide gas concentration at the cleaned flue gas outlet 110 was 100 ppm (vol) and the dust amount 10 mg/Nm³.

TECHNICAL EFFECTS

The gas dispersion pipe of this invention is suitable as the gas dispersion pipe in the conventionally known gas-liquid contact device. When the gas dispersion pipe of this invention with the pipe top end portion formed in a contraction pipe structure with its horizontal cross-sectional area decreasing downward is used, and a gas or a gas containing liquid particles flows through the pipe, pressure loss can be reduced. As a result, a small pressure suffices for sending the gas into the gas dispersion pipe and the power energy for pressurizing the gas is saved.

The gas dispersion pipe of this invention with the pipe bottom end portion formed in a nozzle structure with its horizontal cross-sectional area decreasing downward can send a gas or a gas containing liquid particles which has been sent into the pipe under pressure deep into absorption liquid. As a result, gas-liquid contact efficiency is high and pollutants contained in the gas are efficiently removed. Furthermore, when this gas dispersion pipe is used, pressure loss as the gas flows through the gas dispersion pipe is effectively reduced.

The gas dispersion pipe of this invention with a gas guide member with its horizontal cross-sectional area decreasing downward disposed within the bottom end portion of the gas dispersion pipe is capable of optimizing the horizontal expansion and downward penetration of the gas blown from the pipe end into the absorption liquid. As a result, gas-liquid contact efficiency and pollutant removal rate are improved.

We claim:

1. For use in a flue gas treatment device having its interior divided by vertically spaced partition plates into a plurality of separate chambers, a plurality of gas dispersion pipes, each comprising:

a generally straight, axially elongated, hollow cylindrical pipe body mounted for vertical disposition by a hole formed in one of said partition plates;

a contraction pipe portion detachably connected to a top end of said pipe body and being formed as an annular member formed of resilient material having a downwardly constricting, curvilinear circumferential surface extending to, and being substantially flush with, an interior surface of said hollow cylindrical pipe body; and means for detachably connecting said contraction pipe portion to said pipe body including:
  a reinforcement pipe concentrically attached to said pipe body adjacent the top end thereof,
  an annular positioning ring attached to, and extending radially outwardly from, said reinforcement pipe; and
  annular recess means formed about a bottom end of said contraction pipe member for receiving said top end of said reinforcement pipe and said annular ring.

2. The invention as defined in claim 1 in which said contraction pipe portion is formed of plastic.

3. The invention as defined in claim 1 in which said contraction pipe portion is formed of rubber.

4. The invention as defined in claim 1 including a nozzle structure attached to said pipe body at the bottom end thereof, said nozzle structure comprising a short pipe having its horizontal cross-sectional area decreasing downwardly.

5. The invention as defined in claim 1 in which said detachable short pipe is formed of a resilient material.

6. The invention as defined in claim 5 in which said detachable short pipe is formed of plastic.

7. The invention as defined in claim 5 in which said detachable short pipe is formed of rubber.

8. The invention as defined in claim 5 including means for detachably connecting said detachable short pipe to said pipe body, said means comprising a positioning reinforcing pipe connected to the exterior of said pipe body adjacent the bottom end thereof, and an annular recess formed about an interior surface of said short pipe for receiving said positioning reinforcing pipe.

9. The invention as defined in claim 1 including a gas guide member having its horizontal cross-sectional area increasing downward disposed within the bottom end portion of said pipe body in concentrically spaced relation with respect to the inner wall surface thereof, said guide member being secured to said pipe body by plate members radially extending between and interconnecting said pipe body and said gas guide.

10. The invention as defined in claim 9 wherein said gas guide member is a symmetrical body of revolution having a conically sloping surface and its cross-sectional area increasing downwardly.

11. A gas dispersion pipe for gas-liquid contact in a liquid body wherein gas is supplied to said pipe from a top end thereof and blown out into said liquid body from a bottom end thereof, said pipe comprising:

a generally straight, axially elongated hollow cylindrical pipe body adapted for vertical orientation, a contraction pipe portion detachably connected to said top end of said pipe body, said contraction pipe portion being formed as an annular member having a downwardly constricting, curvilinear circumferential surface extending to, and being substantially flush with, an interior surface of said hollow cylindrical pipe body, means for detachably connecting said contraction pipe section to said pipe body;

a gas guide member having its cross-sectional area increasing downward disposed within the bottom end portion of said pipe body in concentrically spaced relation with respect to the inner wall surface of said pipe body; and means for securing said gas guide member to said pipe body including plate members attached to said gas guide member and extending radially from a center line of said pipe body and connecting therewith.

* * * * *